US008186372B2

(12) United States Patent
Horiba et al.

(10) Patent No.: US 8,186,372 B2
(45) Date of Patent: May 29, 2012

(54) FUEL SHUT-OFF VALVE

(75) Inventors: Shoji Horiba, Aichi-ken (JP); Hiroshi Nishi, Aichi-ken (JP); Naoki Mori, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 1100 days.

(21) Appl. No.: 12/076,864

(22) Filed: Mar. 25, 2008

(65) Prior Publication Data

US 2008/0236672 A1 Oct. 2, 2008

(30) Foreign Application Priority Data

Mar. 30, 2007 (JP) ................................ 2007-095186
Sep. 26, 2007 (JP) ................................ 2007-249062

(51) Int. Cl.
*F16K 24/04* (2006.01)
(52) U.S. Cl. .................... 137/202; 251/334; 123/516
(58) Field of Classification Search .............. 137/202, 137/199, 41, 43, 38, 171, 39, 587; 251/334, 251/333, 359; 277/560, 634, 502, 551; 123/518, 123/516, 519, 520, 198 D
See application file for complete search history.

(56) References Cited

U.S. PATENT DOCUMENTS

| | | | | | |
|---|---|---|---|---|---|
| 5,172,714 | A | * | 12/1992 | Kobayashi et al. | 137/39 |
| 5,579,741 | A | * | 12/1996 | Cook et al. | 123/516 |
| 5,678,590 | A | * | 10/1997 | Kasugai et al. | 137/202 |
| 5,960,816 | A | * | 10/1999 | Mills et al. | 137/202 |
| 6,085,771 | A | * | 7/2000 | Benjey et al. | 137/202 |
| 6,230,732 | B1 | * | 5/2001 | Ganachaud et al. | 137/43 |
| 6,311,675 | B2 | * | 11/2001 | Crary et al. | 123/516 |

(Continued)

FOREIGN PATENT DOCUMENTS

JP U-63-192131 12/1988

(Continued)

OTHER PUBLICATIONS

Office Action mailed Jan. 18, 2011 in corresponding JP patent application No. 2007-249062.

*Primary Examiner* — Eric Keasel
*Assistant Examiner* — David Colon Morales
(74) *Attorney, Agent, or Firm* — Posz Law Group, PLC

(57) ABSTRACT

A fuel shut-off valve includes a casing, an ascendable and descendible float, and an upper valve element, which is actuated by the float to open and close connector passage that communicates the inside of fuel tank with the outside, and which includes a valve body and a ring-shaped seat member. The ring-shaped seat member makes a connector bore, which communicates with the connector passage, therein, and includes a base, a holding portion, a seating portion, a lip-shaped portion, and a thin-film-shaped portion. The seating portion opens and closes the connector passage, and defines an opening of the connector bore. The lip-shaped portion seats on and separates away from the float, and defines the other opening of the connector bore. The thin-film-shaped portion is disposed between the base and the lip-shaped portion, and is deformable elastically upon being pressed by the float when the float seats on the lip-shaped portion.

7 Claims, 11 Drawing Sheets

U.S. PATENT DOCUMENTS

| | | | |
|---|---|---|---|
| 6,532,983 B2 * | 3/2003 | Ganachaud | 137/43 |
| 6,578,597 B2 * | 6/2003 | Groom et al. | 137/202 |
| 6,843,268 B2 * | 1/2005 | Yamada et al. | 137/202 |
| 7,152,586 B2 * | 12/2006 | Aoki et al. | 123/516 |
| 7,819,129 B2 * | 10/2010 | Keefer | 137/202 |
| 2001/0011538 A1 | 8/2001 | Crary et al. | |
| 2007/0000542 A1 * | 1/2007 | Johansen | 137/202 |

FOREIGN PATENT DOCUMENTS

| | | |
|---|---|---|
| JP | U-64-53678 | 4/1989 |
| JP | U-3-48162 | 5/1991 |
| JP | A-07-127754 | 5/1995 |
| WO | WO 98/17490 | 4/1998 |

* cited by examiner (a)

(b)

(c)

(d)

FUEL SHUT-OFF VALVE

The present invention is based on Japanese Patent Application No. 2007-95,186, filed on Mar. 30, 2007, and on Japanese Patent Application No. 2007-249,062, filed on Sep. 26, 2007, the entire contents of which are incorporated herein by reference.

BACKGROUND OF THE INVENTION

1. Field of the Invention

The present invention relates to a fuel shut-off valve, which shuts off fuel from flowing out of discharge port for discharging gases that generate in the fuel tank of vehicle.

2. Description of the Related Art

Within a fuel tank, a fuel shut-off valve has been disposed usually. The fuel shut-off valve not only discharges gases that generate resulting from evaporating fuel, but also shuts off the fuel from flowing out of the discharge port. As one of such fuel shut-off valves, a conventional fuel shut-off valve has been know that comprises a casing, a float, and an upper valve element. The casing is installed on the top of fuel tank, and has a top being provided with a connector passage, which is connected to outside canister. The float is accommodated within the valve chamber that the casing forms within itself, and is exerted to increasing and decreasing buoyant force depending on liquid level within the valve chamber, thereby ascending and descending within the valve chamber. The upper valve element is placed on the top of the float. As the liquid level within the fuel tank ascends, enlarging buoyant force is exerted to the float so that the float and upper valve element ascend to close the connector passage. Thus, the conventional fuel shut-off valve keeps fuel from flowing out to the outside of fuel tank.

It has been required that such a fuel shut-off valve demonstrate high sealability at the sealing portion between the float and/or upper valve element and the connector passage even when the sealing portion is soaked in fuel upon driving vehicle in inclined manner. Japanese Unexamined Patent Publication (KOKAI) Gazette No. 2000-130,271 and Japanese Unexamined Patent Publication (KOKAI) Gazette No. 2002-235,623 have been known to disclose techniques that cope with the requirement. For example, Japanese Unexamined Patent Publication (KOKAI) Gazette No. 2000-130,271 discloses that a ring-shaped seat member, which is provided with a connector bore and which is made of rubber, is disposed on the upper valve element, and that the ring-shaped seat member's upper seating portion is opened and closed with respect to the connector passage's sealing portion, thereby opening and closing the connector bore and/or the connector passage. Moreover, Japanese Unexamined Patent Publication (KOKAI) Gazette No. 2000-130,271 discloses that the ring-shaped seat member's lower leading end is formed as a lip shape, and that the float's upper sealing portion opens and closes the ring-shaped seat member's lip-shaped lower leading end, thereby opening and closing the connector bore and/or the connector passage.

However, since the root of the lip-shaped portion, which is formed at the rubber ring-shaped seat member's lower leading end, turns into a thick base, the lip-shaped portion is less likely to flex. Accordingly, the ring-shaped seat member, which Japanese Unexamined Patent Publication (KOKAI) Gazette No. 2000-130,271 discloses, exhibits lower sealability with respect to the float's upper sealing portion. In view of this, it is possible to think of making the lip-shaped portion itself thinner. However, if such is the case, the lip-shaped portion exhibits weakened strength. Consequently, the lip-shaped portion has exhibited degraded durability.

Moreover, Japanese Unexamined Patent Publication (KOKAI) Gazette No. 2002-235,623 discloses a seat member whose top and bottom makes a seating portion and a lip-shaped portion, respectively. The seating portion and lip-shaped portion are sealed or opened with respect to the sealing portions of the casing and float, the mating members, respectively. Accordingly, the inner-periphery-side protrusion of the upper valve element's valve body is held between the seat member's base and holding portion, which is disposed below the seat member's seating portion, and thereby the seat member is simply retained to the valve body. Consequently, the pressing force that the float exerts to the seat member's lip-shaped portion has been exerted to the entire seat member to deform the seat member's base end and eventually deform the seat member's base. Therefore, there might arise such a fear that the seat member has come off from the upper valve element's valve body.

Moreover, as it is apparent from Japanese Unexamined Patent Publication (KOKAI) Gazette No. 2002-235,623, the seat member's lip-shaped portion receives upward pressing force from the float when the float seat on the seat member's lip-shaped portion. The upward pressing force is transmitted to the seating portion, with which the seat member is provided on the top of the base. Accordingly, the upward pressing force might impair the flatness of the seat member's seating portion. Consequently, the upward pressing force might adversely affect the sealability between the seat member's seating portion and the casing's sealing portion eventually.

SUMMARY OF THE INVENTION

The present invention has been developed in view of the aforementioned circumstances. It is therefore an object of the present invention to provide a fuel shut-off valve comprising a seat member that retains float with higher retaining force and exhibits higher sealability between itself and float.

A fuel shut-off valve according to a first aspect of the present invention, which solves the aforementioned problems, is disposed on the top of fuel tank, and opens and closes connector passage connecting the inside of the fuel tank to the outside, thereby communicating the inside of the fuel tank with the outside and shutting off the connector passage, the fuel shut-off valve comprises:

a casing comprising a valve chamber communicating the inside of the fuel tank with the connector passage, and a first sealing portion surrounding the connector passage;

a float being accommodated in the valve chamber of the casing, having a second sealing portion, and being exerted to increasing and decreasing buoyant force depending on liquid level within the valve chamber, thereby ascending and descending within the valve chamber;

an upper valve element being disposed on the top of the float, and being actuated by the float, which ascends and descends, to open and close the connector passage;

the upper valve element comprising a valve body, and a ring-shaped seat member, the ring-shaped seat member being made from elastomer, being fixed to the valve body and making a connector bore therein, the connector bore having a top opening and a bottom opening;

the ring-shaped seat member comprising a base, a holding portion which holds the valve body of the upper valve element between itself and the base, a seating portion which opens and closes the connector passage, and which defines the top opening of the connector bore of the ring-shaped seat member, a lip-shaped portion which seats on and separates away from the second sealing portion of the float, which protrudes down below beyond the bottom surface of the base and which defines the bottom opening of the connector bore of the ring-shaped seat member, and a thin-film-shaped portion which is disposed between the base and the lip-shaped portion, and which is deformable elastically upon being pressed by the second sealing portion of the float when the second sealing portion seats on the lip-shaped portion.

In a first preferable modification of the fuel shut-off valve according to the first aspect of the present invention, the bottom surface of the ring-shaped seat member's base can preferably make a stopper surface, which defines the topmost position to which the float ascends by means of the buoyant force fully within the valve chamber of the casing.

In a second preferable modification of the fuel shut-off valve according to the first aspect of the present invention, the ring-shaped seat member can preferably further comprise a ring-shaped groove, which is disposed between the bottom surface of the base and the lip-shaped portion.

In a third preferable modification of the fuel shut-off valve according to the first aspect of the present invention further comprises an inner peripheral surface, which faces the connector bore of the base to partially make the base of the ring-shaped seat member, and which is provided with a ring-shaped groove being disposed adjacently to the lip-shaped portion. Note that, in other words, the base's inner peripheral surface can be disposed so as to look the bottom opening of the ring-shaped seat member's connector bore downward inside, and that the ring-shaped groove can be disposed so as to make the lip-shaped portion intervene between itself and the bottom opening.

In a fourth preferable modification of the fuel shut-off valve according to the first aspect of the present invention, the thin-film-shaped portion of the ring-shaped seat member can preferably extend in a diametrically inward direction of the ring-shaped seat member.

In a fifth preferable modification of the fuel shut-off valve according to the first aspect of the present invention, the thin-film-shaped portion of the ring-shaped seat member can preferably incline from small to large outwardly to separate away from the float with respect to a diametric direction of the ring-shaped seat member. Moreover, in a sixth preferable modification of the fuel shut-off valve according to the first aspect of the present invention, the thin-film-shaped portion of the ring-shaped seat member can preferably incline from large to small inwardly to separate away from the float with respect to a diametric direction of the ring-shaped seat member.

In a seventh preferable modification of the fuel shut-off valve according to the first aspect of the present invention, the ring-shaped seat member can preferably further comprise a connecting portion, which is disposed between the base and the lip-shaped portion; and the ring-shaped groove can preferably be disposed between the connecting portion and the base, thereby neighboring the thin-film-shaped portion on the ring-shaped groove.

In an eighth preferable modification of the fuel shut-off valve according to the first aspect of the present invention, the ring-shaped seat member can preferably comprise the ring-shaped groove, which is disposed immediately beneath an inner peripheral surface of the ring-shaped seat member's base. Note herein that the term, the "inner peripheral surface of the seat member's base," involves not only the base's inner peripheral surface, which makes the connector bore and extends in an axial direction of the base, but also a ring-shaped groove, which is dented in a diametrically enlarging direction of the base, when the base is provided with such a ring-shaped groove.

The fuel shut-off valve according to the first aspect of the present invention operates to inhibit fuel from flowing out of fuel tank to the outside in the following manner: that is, when fuel is supplied to fuel tank and is then filled to a predetermined liquid level within the fuel tank, buoyant force resulting from the supplied fuel raises the float and accordingly the upper valve element ascends together with the float; and the ascending upper valve element actuates the seating portion of the ring-shaped seat member to close the connector passage, thereby shutting off the fuel tank with respect to the outside. On the contrary, when the liquid level descends within the fuel tank, the lip-shaped portion of the ring-shaped seat member separates from the second sealing portion of the float to open the connector bore, with which the upper valve element's ring-shaped seat member is provided, before the seating portion of the ring-shaped seat member opens up the connector passage. As a result, the fuel that flows through the connector bore of the upper valve element ring-shaped seat member facilitates the ring-shaped seat member to quickly reopen the connector passage. Therefore, the fuel shut-off valve according to the first aspect of the present invention can demonstrate good valve reopenability as well.

Moreover, when the ascending float seats on the lip-shaped portion of the upper valve element's ring-shaped seat member upon supplying fuel, the second sealing portion of the float presses the lip-shaped portion upward. Note herein that the fuel shut-off valve according to the first aspect of the present invention comprises the thin-film-shaped portion being disposed between the ring-shaped seat member's base and lip-shaped portion. The thin-film-shaped portion is deformable elastically upon being pressed by the float's second sealing portion when the second sealing portion seats on the lip-shaped portion. Accordingly, the upward pressing force exerted by the float's second sealing portion is likely to deform the thin-film-shaped portion being disposed between the base and the lip-shaped portion. Consequently, the ring-shaped seat member's lip-shaped portion exhibits enhanced followability with respect to the float's second sealing portion. Therefore, the ring-shaped seat member can securely seal between the lip-shaped portion and the float's second sealing portion. Moreover, even if the float should have ascended in inclined manner, it is possible for the ring-shaped seat member to securely seal between the lip-shaped portion and the float's second sealing portion because the thin-film-shaped portion undergoes elastic deformation freely.

In addition, the thin-film-shaped portion under goes elastic deformation to absorb the pressing force that the float's second sealing portion exerts. As a result, it is possible to inhibit the entire ring-shaped seat member from undergoing elastic deformation. Therefore, the ring-shaped seat member's base and holding portion are inhibited from deforming elastically so that the base and holding portion are prohibited from coming off from their fixed locations to the upper valve element's valve body. Moreover, it is possible for the ring-shaped seat member's seating portion to exhibit predetermined flatness securely so that the seating portion shows upgraded sealability to the casing's first sealing portion.

In the first preferable modification of the fuel shut-off valve according to the first aspect of the present invention, the bottom surface of the ring-shaped seat member's base makes a stopper surface, which defines the topmost position to which the float ascends by means of the buoyant force fully within the valve chamber of the casing. Accordingly, the base's bottom surface inhibits the float from ascending excessively. Consequently, the base's bottom surface can prohibit the ring-shaped seat member's lip-shaped portion and thin-film-shaped portion from deforming excessively. Thus, the ring-shaped seat member exhibits improved durability.

In the second preferable modification of the fuel shut-off valve according to the first aspect of the present invention, the ring-shaped seat member further comprises a ring-shaped groove, which is disposed between the bottom surface of the base and the lip-shaped portion. The ring-shaped groove is formed as such a shape for providing the thin-film-shaped portion between the ring-shaped seat member's base and lip-shaped portion, and for neighboring the ring-shaped groove on the thin-film-shaped portion. If such is the case, the ring-shaped groove is formed parallel to the die-releasing direction of the ring-shaped seat member. Thus, the ring-shaped seat member exhibits good die releasability upon completing the molding.

In the third preferable modification of the fuel shut-off valve according to the first aspect of the present invention, the base of the ring-shaped seat member has an inner peripheral surface, which makes the connector bore of the base, and which is provided with a ring-shaped groove being disposed adjacently to the lip-shaped portion. In this instance, the upward pressing force that the float's second sealing portion exerts makes the thin-film-shaped portion more likely to undergo elastic deformation. Hence, the thin-film-shaped portion exhibits more enhanced sealability with respect to the float's second sealing portion.

In the fourth preferable modification of the fuel shut-off valve according to the first aspect of the present invention, the thin-film-shaped portion of the ring-shaped seat member extends in a diametrically inward direction of the ring-shaped seat member. Accordingly, the ring-shaped seat member produces axial force, which makes the thin-film-shaped portion more likely to deform. Consequently, even when the float ascends in inclined manner and then seats on the ring-shaped seat member's lip-shaped portion in inclined manner, the thin-film-shaped portion can deform while following up the inclined float's second sealing portion substantially. Therefore, it is possible to produce good sealability between the lip-shaped portion and the inclined or not-inclined second sealing portion securely.

In the fifth preferable modification of the fuel shut-off valve according to the first aspect of the present invention, the thin-film-shaped portion of the ring-shaped seat member inclines from small to large outwardly to separate away from the float with respect to a diametric direction of the ring-shaped seat member. In this instance, it is possible as well to seal between the ring-shaped seat member's lip-shaped portion and the float's second sealing portion securely, because the thin-film-shaped portion is more likely to deform elastically. From above, it is apparent that the sixth preferable modification operates and effects advantages in the same manner as the fifth preferable modification.

In the seventh preferable modification of the fuel shut-off valve according to the first aspect of the present invention, the ring-shaped seat member further comprises a connecting portion, which is disposed between the base and the lip-shaped portion; and the ring-shaped groove is disposed between the connecting portion and the base, thereby neighboring the thin-film-shaped portion on the ring-shaped groove. As a result, the thin-film-shaped portion turns into a part that has a thinner thickness than that of the connecting portion, and that is more likely to deform than the connecting portion is. Accordingly, the thin-film-shaped portion flexes upon the float's seating on the lip-shaped portion of the ring-shaped seat member. Therefore, it is possible to secure the sealability between the float's second sealing portion and the ring-shaped seat member's lip-shaped portion satisfactorily.

In the eighth preferable modification of the fuel shut-off valve according to the first aspect of the present invention, the ring-shaped seat member comprises the ring-shaped groove, which is disposed immediately beneath an inner peripheral surface of the ring-shaped seat member's base. As a result, the thin-film-shaped portion is disposed immediately below the base's inner peripheral surface. Therefore, the thin-film-shaped is much more likely to flex upon the float's seating on the ring-shaped seat member's lip-shaped portion. Thus, the thin-film-shaped portion can produce the sealability between the float's second sealing portion and the ring-shaped seat member's lip-shaped portion much more securely.

A fuel shut-off valve according to a second aspect of the present invention, which solves the aforementioned problems, is disposed on the top of fuel tank, and opens and closes connector passage connecting the inside of the fuel tank to the outside, thereby communicating the inside of the fuel tank with the outside and shutting off the connector passage, the fuel shut-off valve comprises:

a casing comprising a valve chamber communicating the inside of the fuel tank with the connector passage, and a passage-forming protrusion surrounding and making the connector passage provisionally and being provided with a ring-shaped seat member, the ring-shaped seat member being made from elastomer and being fixed to the passage-forming protrusion;

a float being accommodated in the valve chamber of the casing, being exerted to increasing and decreasing buoyant force depending on liquid level within the valve chamber, thereby ascending and descending within the valve chamber to open and close the connector passage, and comprising a sealing portion being disposed at the top of the float, the sealing portion making valve being openable and closable between itself and the ring-shaped seat member of the casing;

the ring-shaped seat member comprising a base, a holding portion which holds the passage-forming protrusion of the casing between itself and the base, a lip-shaped portion which seats on and separates away from the sealing portion of the float, which protrudes down below beyond the bottom surface of the base, and which defines an opposite opening of the connector passage, and a thin-film-shaped portion which is disposed between the base and the lip-shaped portion, and which is deformable elastically upon being pressed by the sealing portion of the float when the sealing portion seats on the lip-shaped portion.

The operations of the fuel shut-off valve according to the second aspect of the present invention will be hereinafter described. First, when fuel is supplied to fuel tank and is then filled to a predetermined liquid level within the fuel tank, the supplied fuel produces buoyant force that raises the float. Then, the ascending float actuates the ring-shaped seat member, which is fixed to the passage-forming protrusion of the casing, and thereby the ring-shaped seat member closes the connector passage because the ring-shaped seat member's lip-shaped portion seals between itself and the float's sealing portion. Thus, the fuel shut-off valve according to the second aspect of the present invention shuts off the fuel tank with respect to the outside, and inhibits the fuel from flowing out of the fuel tank to the outsider. On the contrary, when the liquid level descends within the fuel tank, the float descends to cancel the sealing between the float's sealing portion and the ring-shaped seat member's lip-shaped portion, thereby opening up the connector passage.

Moreover, when the float ascents to seat on the lip-shaped portion of the ring-shaped seat member upon supplying fuel, the sealing portion of the float presses the lip-shaped portion upward. Note herein that the fuel shut-off valve according to the second aspect of the present invention likewise comprises the thin-film-shaped portion being disposed between the ring-shaped seat member's base and lip-shaped portion. Since the thin-film-shaped portion can deform elastically when the float's sealing portion exerts pressing force to the lip-shaped portion upon the seating of the sealing portion on the lip-shaped portion, the pressing force, which the sealing portion exerts to the lip-shaped portion, makes the thin-film-shaped portion likely to undergo elastic deformation with ease. Accordingly, the lip-shaped portion exhibits enhanced followability with respect to the sealing portion. Consequently, the lip-shaped portion can securely seal between itself and the sealing portion. Moreover, even if the float should have ascended in inclined manner, the thin-film-shaped portion that undergoes elastic deformation freely enables the ring-shaped seat member to seal between the lip-shaped portion and the inclined float's sealing portion securely.

In addition, the pressing force that the float's sealing portion exerts is absorbed by the ring-shaped seat member's thin-film-shaped portion that undergoes elastic deformation. As a result, the ring-shaped seat member is inhibited from deforming elastically entirely. Therefore, it is possible to inhibit the ring-shaped seat member's base and holding portion from deforming elastically. Thus, it is possible to prevent the base and holding portion from coming off from the casing's passage-forming protrusion. Note that it is also possible to apply the above-described first through eighth preferable modifications, which are directed to the fuel shut-off valve according to the first aspect of the present invention, to the fuel shut-off valve according to the second aspect of the present invention.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

FIG. 8 is partially-enlarged cross-sectional views for illustrating ring-shaped seat members that make modified versions of the present fuel shut-off valve according to Example No. 1; wherein FIG. 8(a) shows a first modified ring-shaped seat member whose lip-shaped portion extends from a thin-film-shaped portion in inclined manner; FIG. 8(b) shows a modified second ring-shaped seat member whose inner peripheral surface is provided with a ring-shaped groove that is disposed so as to make a lip-shaped portion intervene between the ring-shaped groove and the bottom opening of the ring-shaped seat member; FIG. 8(c) shows a third modified ring-shaped seat member which is provided with a projected portion that is disposed between a thin-walled portion and a lip-shaped portion; and FIG. 8(d) shows the original ring-shaped seat member that makes the present fuel shut-off valve according to Example No. 1.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

EXAMPLES

Example No. 1

Figure 1:
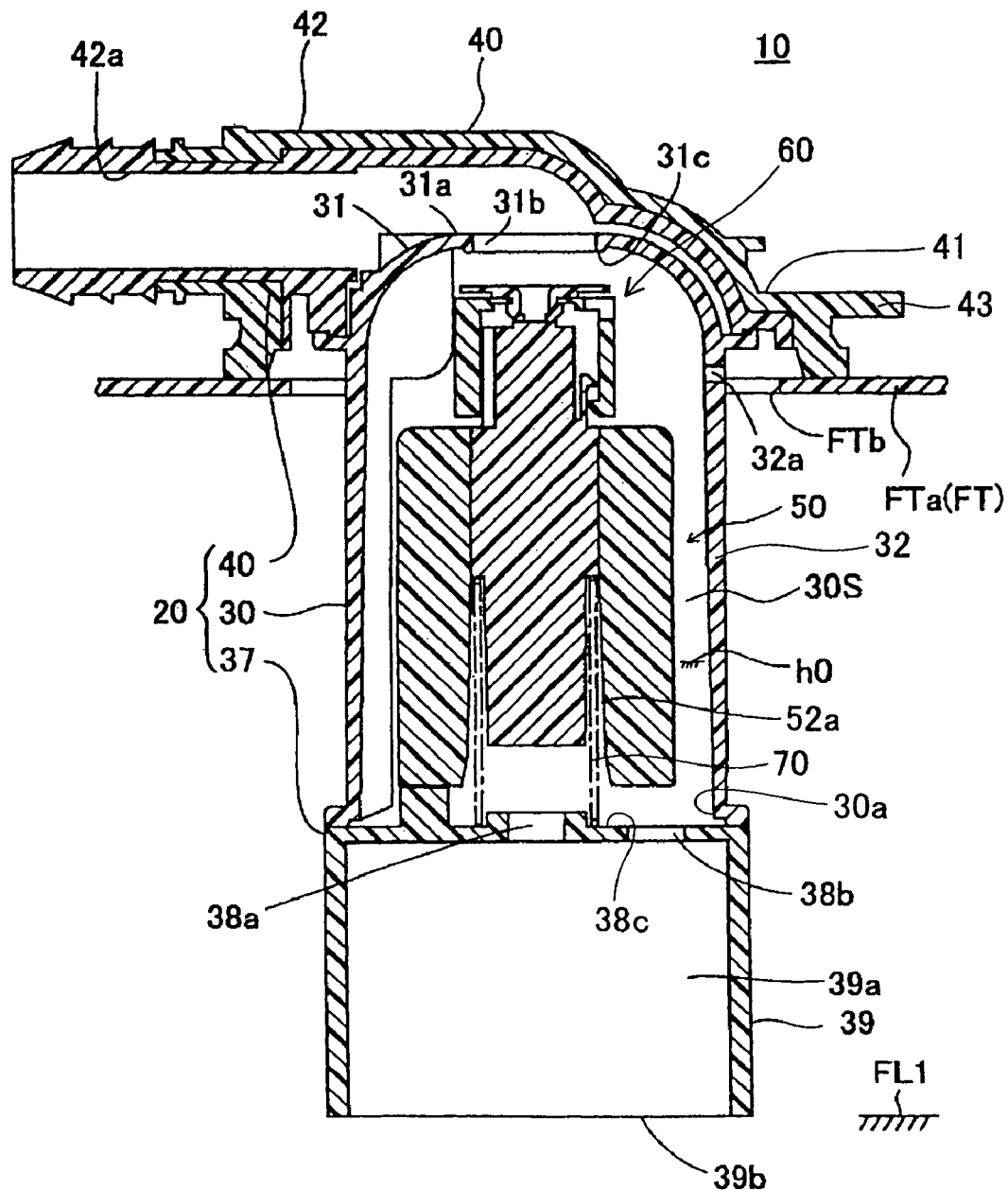
FIG. 1 is a cross-sectional view for illustrating a fuel shut-off valve according to Example No. 1 of the present invention, fuel shut-off valve which is fixed on the top of a fuel tank.

A fuel shut-off valve according to Example No. 1 of the present invention will be hereinafter described with reference to the drawings. As illustrated in FIG. 1, the present fuel shut-off valve 10 according to Example No. 1 is installed on the top of a fuel tank FT. The fuel tank FT has a surface that is formed of a composite resinous material containing polyethylene, and has a tank upper wall FTa that is provided with an installation hole FTb. The present fuel shut-off valve 10 is fixed on the tank upper wall FTa in such a manner that its bottom goes into the installation hole FTb. The present fuel shut-off valve 10 controls the flow of fuel into a canister when the fuel within the fuel tank FT ascends to a predetermined liquid level FL1 during fuel supply.

The present fuel shut-off valve 10 according to Example No. 1 comprises a casing 20, a float mechanism 50, and a spring 70, as the major component parts. The casing 20 comprises a casing body 30, a bottom member 37, and a lid 40. The space that the casing body 30 and bottom member 37 surround makes a valve chamber 30S. The float mechanism 50, which the spring 70 supports, is accommodated in the valve chamber 30S.

Figure 2:
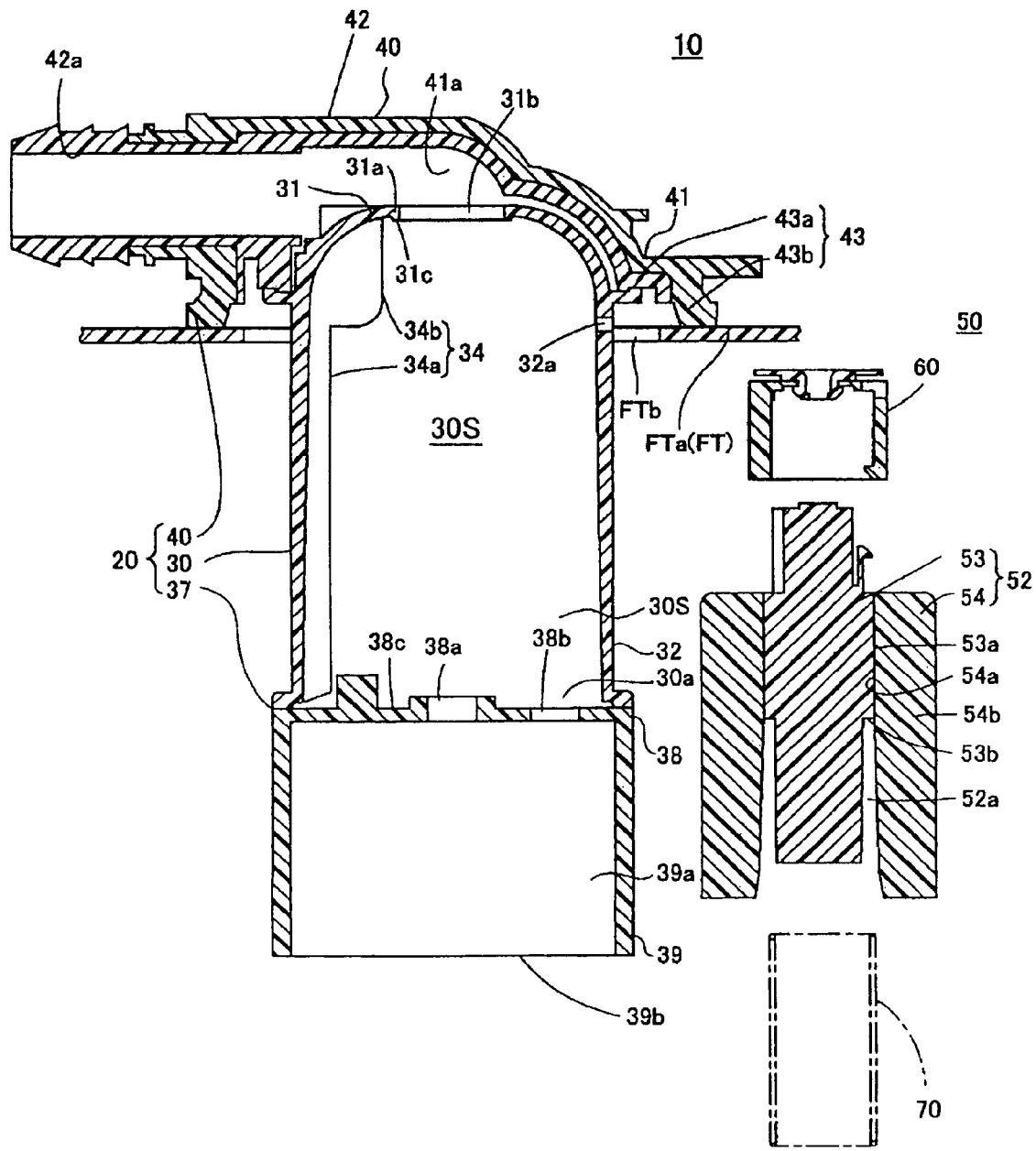
FIG. 2 is an exploded cross-sectional view for illustrating the present fuel shut-off valve according to Example No. 1 in disassembled state.

As specifically illustrated in FIG. 2, the casing body 30 comprises a top-walled portion 31 and a side-walled portion 32, and is formed as an inverted cup shape that the top-walled portion 31 and side-walled portion 32 surround. The bottom of the casing body 30 makes an opening 30a. The top-walled portion 31 is provided with a passage-forming protrusion 31a. The passage-forming protrusion 31a has a connector passage 31b being opened about the center, and protrudes diametrically inward from the inner peripheral surface of the top-walled portion 31. The passage-forming protrusion 31a has a first sealing portion 31c. The first sealing portion 31c looks the bottom opening of the connector passage 31b downward inside therefrom, and protrudes downward. In other words, the connector passage 31b makes the downwardly-protruding first sealing portion 31c on the side of the valve chamber 30S. The side-walled portion 32 is provided with a first communication hole 32a. The first communication hole 32a communicates the inside of the fuel tank FT with the valve chamber 30S. Moreover, the inner peripheral surface of the side-walled portion 32 is provided with casing-side guiding portions 34 for guiding the float mechanism 50. Note that the casing-side guiding portions 34 are disposed at four locations and at equal intervals in the peripheral direction of the side-walled portion 32, and are formed as a rib shape. As expressly shown in FIG. 2, the casing-side guiding portions 34 comprise a lower guide rib 34a, and an upper guide rib 34b, respectively. The lower guide rib 34a is disposed on the lower side of the casing body 30. The upper guide rib 34b is disposed on the upper side of the casing body 30, and protrudes more inward diametrically than the lower guide rib 34a does.

The bottom member 37 is a member for closing a part of the casing body 30's opening 30a, and for introducing gaseous fuel and liquid fuel into the valve chamber 30S. The bottom member 37 comprises a bottom plate 38 and a hollow cylinder-shaped portion 39 being formed integrally with the bottom plate 38, and is welded to the bottom end of the casing body 30 at the outer periphery of the bottom plate 38. The bottom plate 38 is provided with distributor holes 38a and 38b, and is further provided with a spring-supporting portion 38c for supporting the bottom end of the spring 70. The hollow cylinder-shaped portion 39 makes an introductory passage 39a with an introductory opening 39b, thereby leading gaseous fuel and liquid fuel coming from the introductory opening 39b into the valve chamber 30S through the distributor hole 38a.

The lid 40 comprises a lid body 41, a pipe-shaped portion 42, and a flange 43 that are formed integrally. The pipe-shaped portion 42 protrudes from the center of the lid body 41 laterally outward. The flange 43 is disposed around the outer periphery of the lid body 41. The pipe-shaped portion 42 is provided with a lid-side passage 42a being disposed therein. One of the opposite ends of the lid-side passage 42a is connected to the valve chamber 30S of the casing body 30 through the connector passage 31b, and the other one of the opposite ends thereof is connected to a canister (not shown). As explicitly shown in FIG. 2, the bottom surface of the lid body 41 is provided with an inner weld end 43a to be welded onto a top-end side of the casing body 30. Moreover, the bottom surface of the flange 43 is provided with an outer weld end 43b to be welded onto the top wall FTa of the fuel tank FT.

The float mechanism 50 makes a 2-stage valve structure, which exhibits improved valve reopening characteristic. Specifically, as expressly illustrated in FIG. 2, the float mechanism 50 comprises a float 52, and an upper valve element 60. The upper valve element 60 is disposed on the top of the float 52. As shown in FIG. 2, the float 52 comprises a first floatable portion 53, and a second floatable portion 54. The second floatable portion 54 is disposed on an outer periphery of the first floatable portion 53, and is assembled integrally with the first floatable portion 53. The first floatable portion 53 is formed as a solid cylindrical pillar shape, and comprises a first floatable body 53a. The second floatable portion 54 is formed as a hollow cylindrical shape, and comprises a second floatable body 54b. The second floatable body 54b is provided with an accommodation bore 54a. The first floatable portion 53 is fitted into the accommodation bore 54a, and is thereby integrated with the second floatable portion 54. Moreover, the first floatable body 53a is provided with a step-shaped portion on the bottom outer periphery. The step-shaped portion makes a spring-supporting portion 53b, and supports the top end of the spring 70. The spring 70 is disposed in a spring-accommodating clearance 52a, a space formed between the first floatable portion 53 and the second floatable portion 54, as explicitly shown in FIG. 1. Thus, the spring 70 is bridged over between the first floatable portion 53a's spring-supporting portion 53b and the bottom member 37's spring-supporting portion 38c.

Figure 3:
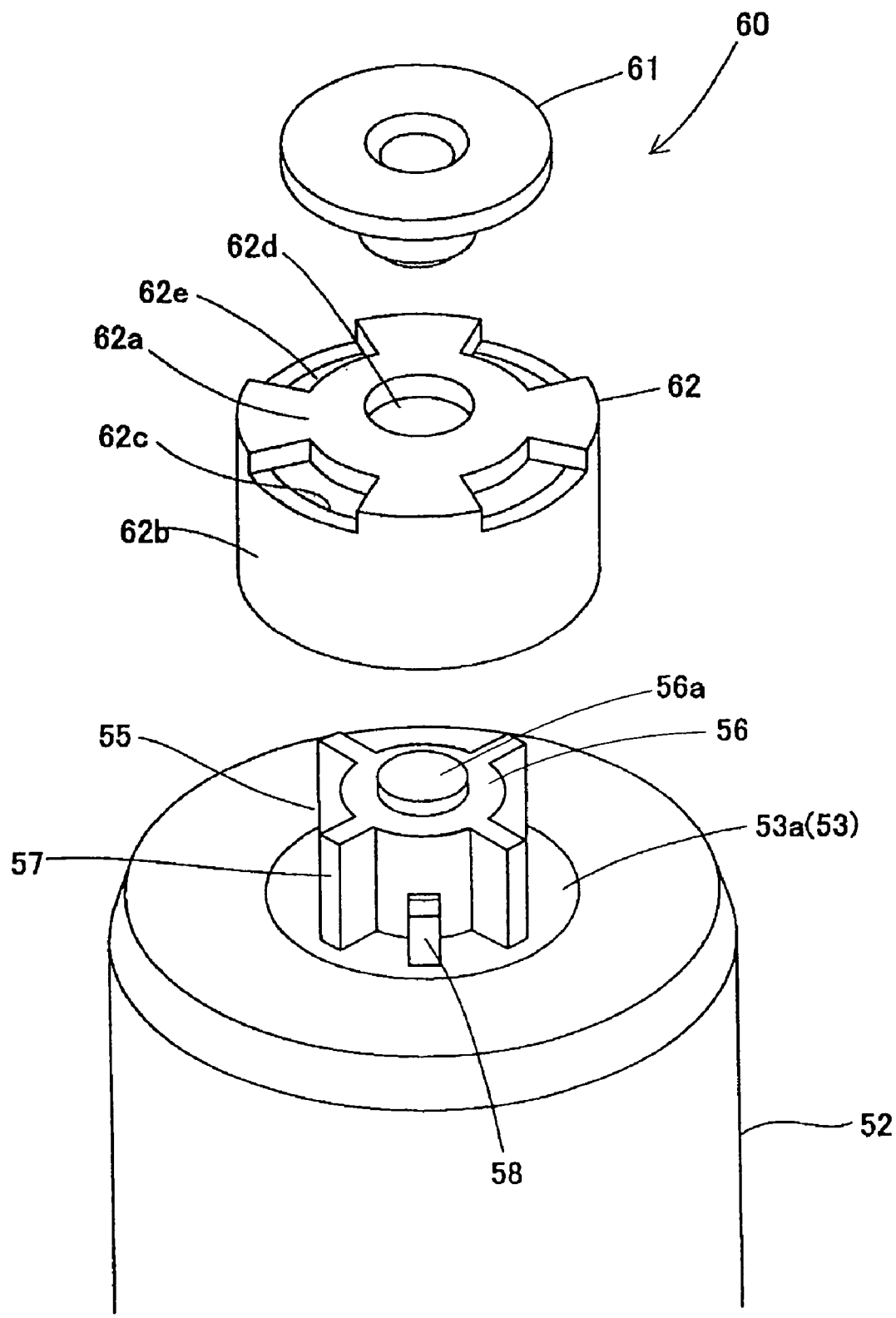
FIG. 3 is a perspective view for illustrating the present fuel shut-off valve according to Example No. 1, perspective view which shows a float and an upper valve element that make the present fuel shut-off valve in disassembled state.
Figure 4:
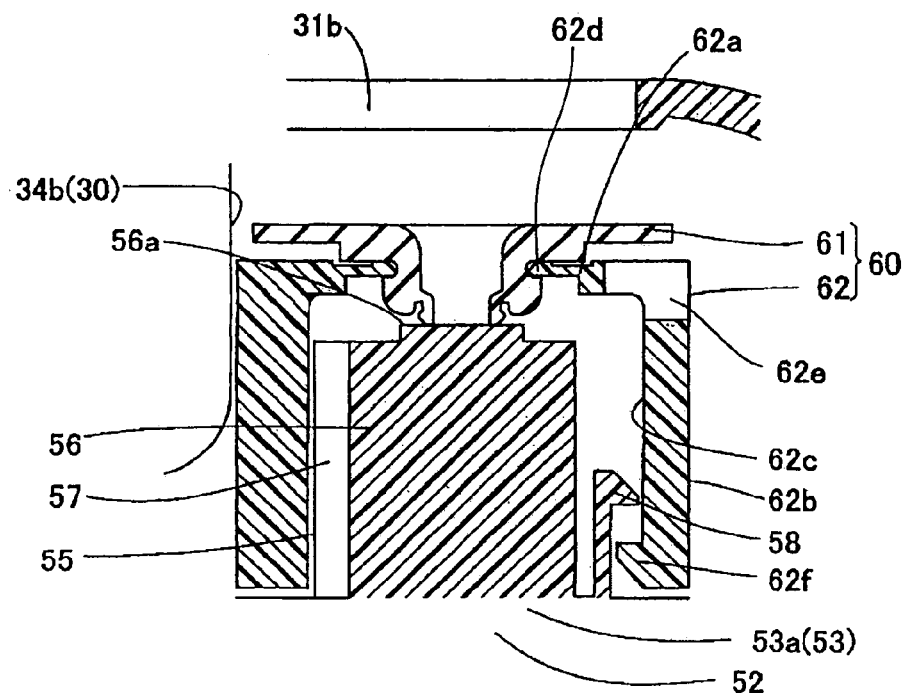
FIG. 4 is a cross-sectional view for illustrating a first major part of the present fuel shut-off valve according to Example No. 1 at around the upper valve element.

As illustrated in FIGS. 3 and 4, a valve-supporting portion 55 is disposed on the top of the first floatable portion 53's first floatable body 53a so as to protrude therefrom. The valve-supporting portion 55 is a part that supports the upper valve element 60, and comprises a supporter protrusion 56, a solid cylindrical pillar-shaped protrusion. The top surface of the supporter protrusion 56 makes a second sealing portion 56a, a flat surface. Moreover, the valve-supporting portion 55 is provided with valve-side guiding portions 57, which guide the upper valve element 60 in the ascending and descending directions, on the outer periphery. The valve-side guiding portions 57 are disposed at four locations and at equal intervals in the peripheral direction of the valve-supporting portion 55, and are formed as a rib shape, respectively. In addition, the first floatable portion 53 is provided with two upwardly-protruding engager claws 58 on the top surface. The engager claws 58 are for inhibiting the upper valve element 60 from coming off from the vale-supporting portion 55, and are disposed at two locations, which are disposed on an outer peripheral side with respect to the valve-supporting portion 55, on the first floatable portion 53's top surface. Note that only one of the two engager claws 58 appear in FIG. 3.

As illustrated in FIG. 4, the upper valve element 60 not only opens and closes the connector passage 31b, but it also improves the reopenability of the fuel shut-off valve. The upper valve element 60 is supported ascendably and descendably to the valve-supporting portion 55 of the float 52. The upper valve element 60 comprises a valve body 62, and a ring-shaped seat member 61. The valve body 62 is formed as a bottomed hollow cylindrical shape. The ring-shaped seat member 61 is retained to the valve body 62.

Figure 5:
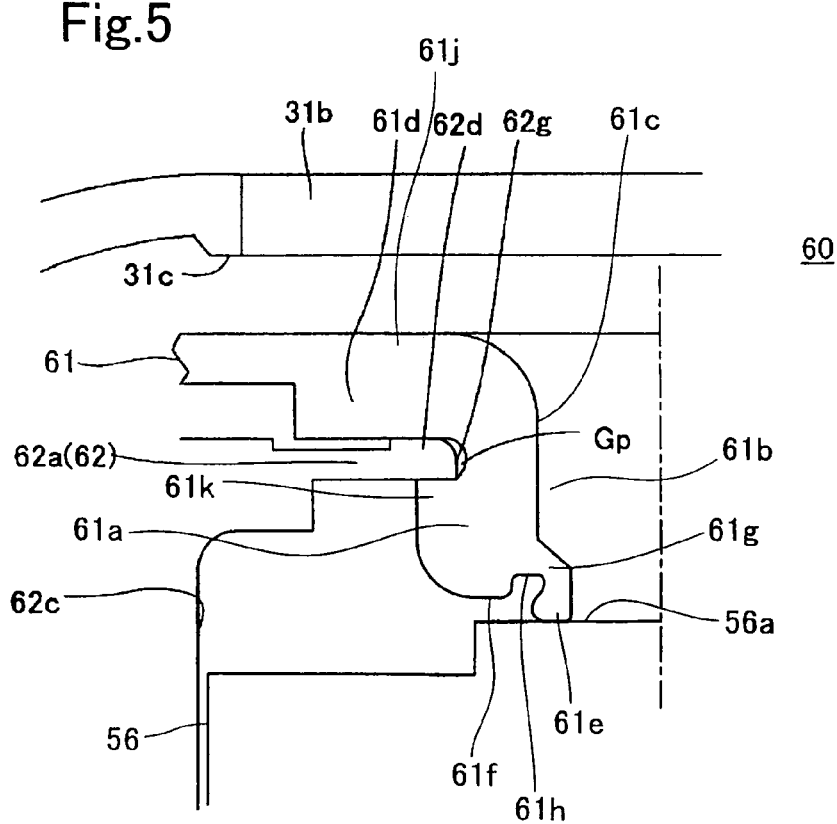
FIG. 5 is a semi-cross-sectional view, an enlarged cross-sectional view, for illustrating a second major part of the present fuel shut-off valve according to Example No. 1 at around a seat member that makes the fuel shut-off valve.

As illustrated in FIGS. 4 and 5, the valve body 62 comprises a disk-shaped top wall 62a, and a hollow cylindrical-shaped side wall 62b (see FIG. 4). The side wall 62b protrudes from the outer periphery of the top wall 62a downward. The inside of the valve body 62 makes a supporting bore 62c. The central portion of the top wall 62a is provided with a fixing portion 62d for retaining the ring-shaped seat member 61. As shown in FIG. 4, the valve body 62 is provided with four ventilation bores 62e for connecting the supporting bore 62c to the outside. Note that the ventilation bores 62e are disposed at four locations in the upper outer periphery of the valve body 62 so as to penetrate the side wall 62b at the top. The side wall 62b is provided with two engagee claws 62f, which engage with the engager claws 58 of the float 52, at two locations on the inner peripheral surface. Moreover, the outer periphery of the valve body 62's side wall 62b is guided by the upper guide rib 34b, which is disposed on the inner peripheral surface of the casing 30 as shown in FIG. 4. In addition, the inner periphery of the valve body 62's side wall 62b is guided by the valve-supporting portion 55's valve-side guiding portion 57.

Thus, the valve body 62 is disposed so that it is guided over the entire length of the upper valve element 60's asendable/descendable range.

As illustrated in FIG. 5, the ring-shaped seat member 61 is formed as a ring shape that is provided with a connector bore 61b at the central portion. The ring-shaped seat member 61 comprises a base 61a, a holding portion 61d, a seating portion 61j, and a lip-shaped portion 61e that are molded integrally with elastomeric material. The holding portion 61d holds the fixing portion 62d of the valve body 62 between itself and the base 61a. The seating portion 61j opens and closes the connector passage 31b, and demarcates the top opening of the connector bore 61b. The lip-shaped portion 61e is opened and closed by the second sealing portion 56a of the float 52's supporter protrusion 56, demarcates the bottom opening of the connector bore 61b, and protrudes down below the bottom surface of the base 61a. Moreover, the ring-shaped seat member 61 further comprises a thin-film-shaped portion 61g, which is disposed between the base 61a and the lip-shaped portion 61e. The thin-film-shaped portion 61g can deform elastically by means of pressing by the second sealing portion 56a of the float 52's supporter protrusion 56 when the second sealing portion 56a seats on the lip-shaped portion 61e. In addition, the ring-shaped seat member 61 further comprises a ring-shaped groove 61h, which is disposed between the bottom surface of the base 61a and the lip-shaped portion 61e. Note that the bottom surface of the base 61a makes a stopper surface 61f, which defines the topmost position to which the float 52 ascends by means of buoyant force fully within the valve chamber 30S. Also note that the thin-film-shaped portion 61g of the ring-shaped seat member 61 can incline from small to large outwardly to separate away from the float 52 with respect to a diametric direction of the ring-shaped seat member 61.

The ring-shaped seat member 61 deforms elastically to exhibit enhanced sealability when it seats on the first sealing portion 31c of the casing body 30, because the base 61a is disposed with a clearance provided between itself and the top wall 62a of the valve body 62 as expressly shown in FIGS. 4 and 5. Moreover, the ring-shaped seat member 61 deforms elastically to exhibit more enhanced sealability when the second sealing portion 56a of the float 52's supporter protrusion 56 seats on the lip-shaped portion 61e, because the lip-shaped portion 61e protrudes down below the stopper surface 61f, the bottom surface of the base 61a. In addition, since the ring-shaped seat member 61 further comprises the thin-film-shaped portion 61g that is disposed between the base 61a and the lip-shaped portion 61e, the thin-film-shaped portion 61g undergoes elastic deformation when the second sealing portion 56a presses the lip-shaped portion 61e so that the ring-shaped seat member 61 exhibits much more enhanced sealability between the lip-shaped portion 61e and the second sealing portion 56a.

The ring-shaped seat member 61 is retained to the valve body 62 in such a manner that the base 61a is press fitted into the fixing portion 62d of the valve body 62. In other words, as explicitly shown in FIG. 5, the fixing portion 62d comprises a fixing hole 62g that penetrates the top wall 62a of the valve body 62. On the other hand, the base 61a comprises a diametrically-expanded portion 61k. The diametrically-expanded portion 61k is press fitted into the fixing hole 62g, and thereby the valve body 62's top wall 62a is held between the holding portion 61d, being disposed under the seating portion 61j, and the diametrically-expanded portion 61k. Accordingly, the ring-shaped seat member 61 is fixed to the valve body 62 in such a manner that it is inhibited from coming off from the top wall 62a of the valve body 62. In this instance, not only the base 61a is not provided with such an interference allowance that it is compressed by the fixing portion 62d, but also it produces a clearance Gp between itself and the fixing portion 62d, as shown in FIG. 5. Thus, the base 61a is allowed to undergo elastic deformation. Consequently, when the ring-shaped seat member 61 is fixed to the fixing portion 62d, the seating portion 61j and lip-shaped portion 61e of the ring-shaped seat member 61 do not undergo elastic deformation at all.

Figure 6:
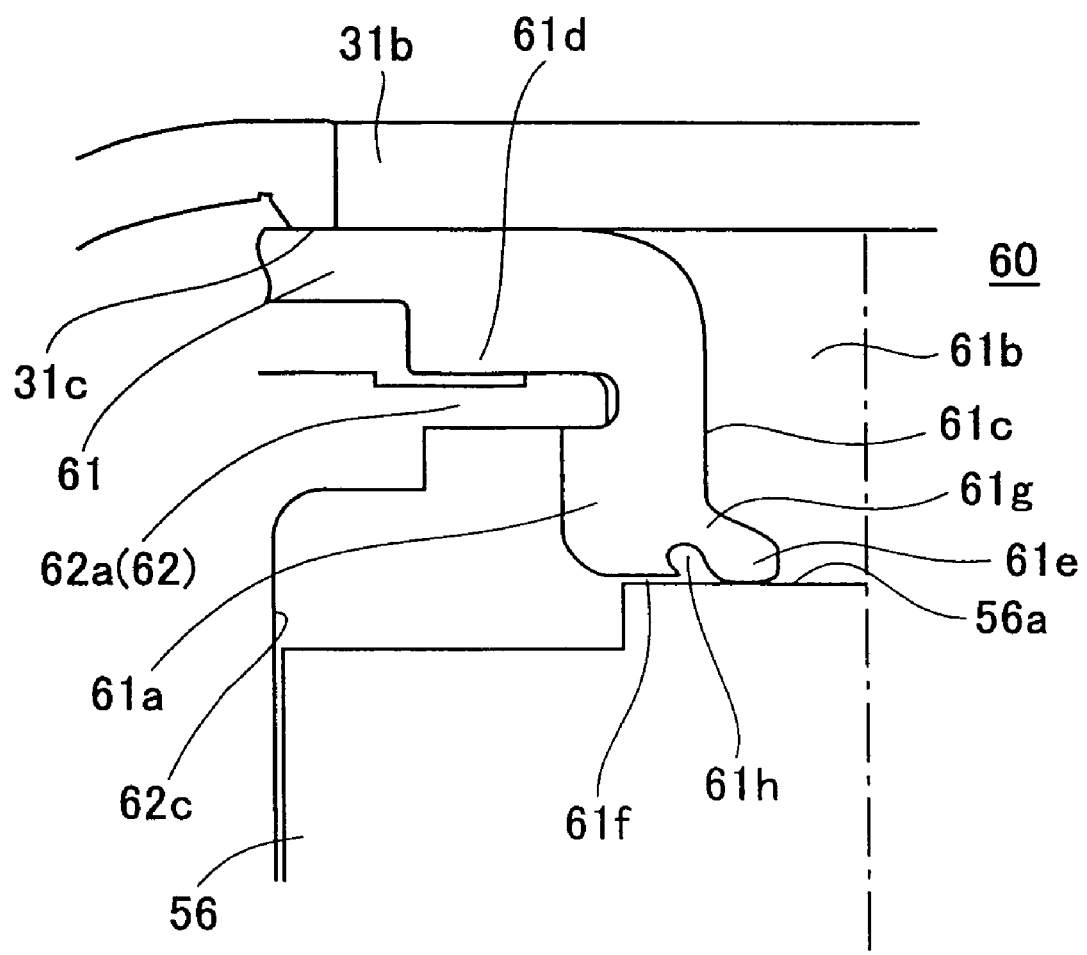
FIG. 6 is a semi-cross-sectional view, an enlarged cross-sectional view, for illustrating the second major part of the present fuel shut-off valve according to Example No. 1 at around the seat member when the fuel liquid level ascends therein.
Figure 7:
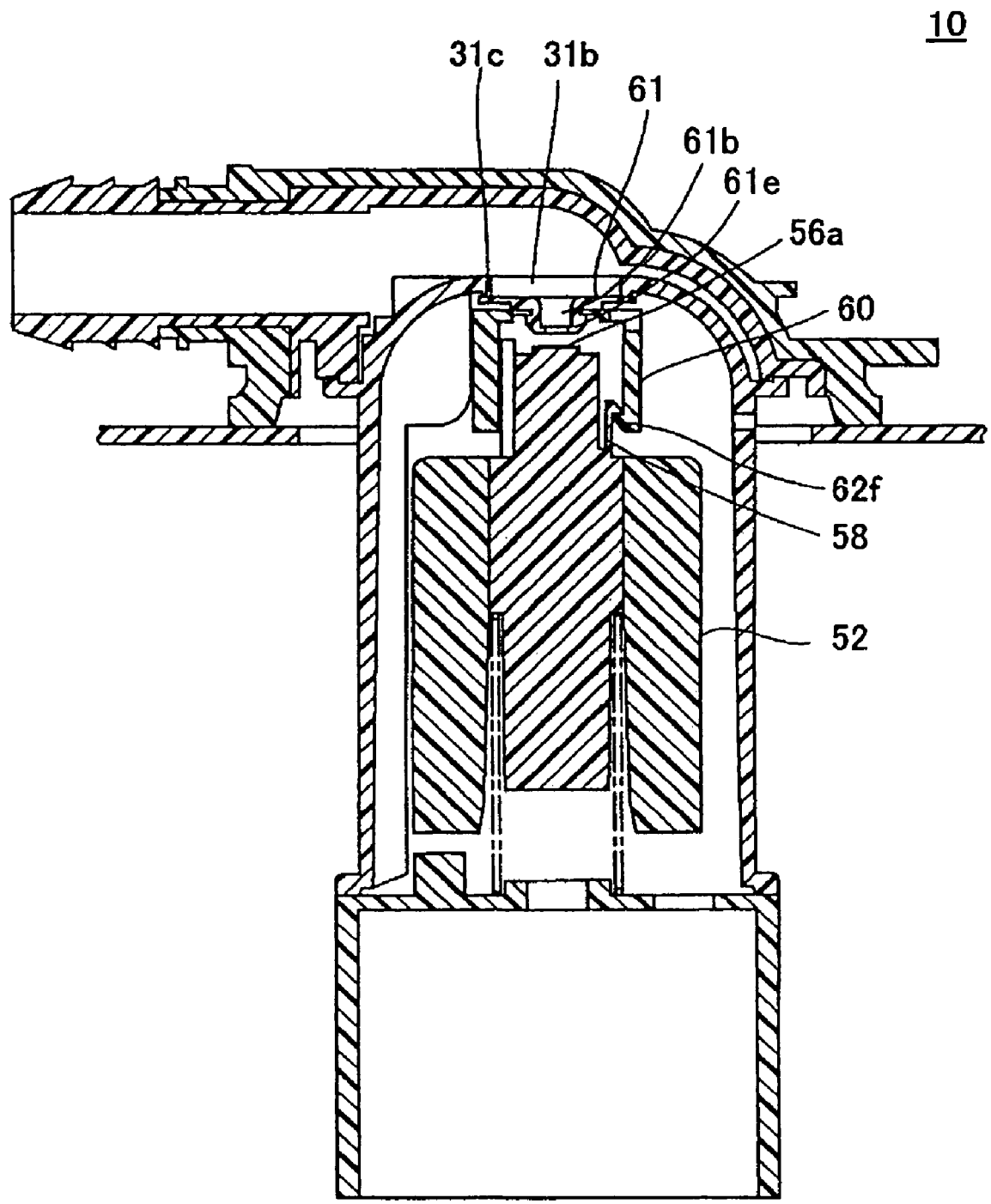
FIG. 7 is an explanatory cross-sectional view for illustrating how the present fuel shut-off valve according to Example No. 1 operates when the fuel liquid level descends therein.

How the present fuel shut-off valve 10 according to Example No. 1 operates will be hereinafter described. As can be appreciated from FIG. 1, when liquid fuel is supplied into the fuel tank FT upon refilling a vehicle with liquid fuel, the liquid-fuel level ascends within the fuel tank FT. Being accompanied by the ascending liquid-fuel level, gaseous fuel, which is kept hovering on the top inside the fuel tank FT, first flows into the cylinder-shaped portion 39 through the introductory passage 39a, and then flows into the valve chamber 30S through the distributor holes 38a and 38b via the introductory opening 39b inside the cylinder-shaped portion 39. Further, the gaseous fuel is let out to the canister from the valve chamber 30S by way of the connector passage 31b and lid-side passage 42a. When the liquid-fuel level reaches a predetermined liquid level FL1, the liquid fuel closes the introductory opening 39b, and thereby the tank inner pressure increases within the fuel tank FT. Under the circumstances, when the differential pressure between the tank inner pressure and the pressure within the valve chamber 30S enlarges, the liquid fuel flows into the valve chamber 30S through the distributor holes 38a and 38b by way of the introductory passage 39a, and thereby the liquid-fuel level ascends within the valve chamber 30S. When the liquid-fuel level reaches a height h0 and then goes above beyond it within the valve chamber 30S, the balance between an upward force, resulting from buoyant force exerted to the float 52 and load that the spring 70 applies to the float 52, and a downward force, resulting from the float mechanism 50's own weight, has become unbalanced so that the upward force exceeds the downward force. As a result, the float mechanism 50 ascends integrally. At this moment, the float mechanism 50 is ascending in such a manner that the lip-shaped portion 61e of the upper valve element 60 seats on the second sealing portion 56a of the float 52 to close the connector bore 61b (see FIG. 1). Eventually, as illustrated in FIG. 6 or 7, the ring-shaped seat member 61 of the upper valve element 60 seats on the first sealing portion 31c of the casing body 30 to close the connector passage 31b. When both of the connector bore 61b and connector passage 31b are thus closed, the liquid fuel within the fuel tank FT is inhibited from flowing out to the canister. Moreover, since the liquid fuel stays within an inlet pipe, a fuel-supplying gun stops refilling the liquid fuel automatically when the fuel-supplying gun touches the liquid fuel. As described above, upon refilling the fuel tank FT with liquid fuel, the present fuel shut-off valve 10 according to Example No. 1 can not only let out gaseous fuel from the fuel tank FT but also can inhibit liquid fuel from flowing out of the fuel tank FT.

On the other hand, when the liquid fuel inside the fuel tank FT is consumed to lower the liquid-fuel level within the fuel tank FT, the float 52 descends because the buoyant force being exerted thereto decreases. Accordingly, the second sealing portion 56a of the float 52 separates away from the lip-shaped portion 61e of the upper valve element 60 to open the connector bore 61b of the upper valve element 60's ring-shaped seat member 61. The opened connector bore 61b makes the pressure at around the bottom of the upper valve element 60 equal to the pressure at around the connector passage 31b. When the float 52 further descends, the engager claws 58 of the float 52 engage with the engagee claws 62f of the upper valve element 60 to integrate the float 52 with the upper valve element 60. The thus integrated float 52 and upper valve element 60 keep on descending further. The descending upper valve element 62 separates the ring-shaped seat member 61 from the first sealing portion 31c of the casing body 30, thereby opening the connector passage 31b. At this moment, the ring-shaped seat member 61's lip-shaped portion 61e, which separates away from the float 52's second sealing portion 56a, first opens up the ring-shaped seat member 61's connector bore 61b whose passage area is made smaller than the passage area of the connector passage 31b. Accordingly, the opened-up connector bore 61b decreases the pressure at around the bottom of the upper valve element 60, thereby making the valve-closing-direction force, which is exerted to the upper valve element 60 to close the connector passage 31b, smaller. Consequently, the present fuel shut-off valve 10 according to Example No. 1 demonstrates good valve reopenability.

As illustrated in FIG. 6, when the float 52, which ascends upon refueling liquid fuel, seats on the lip-shaped portion 61e of the upper valve element 60's ring-shaped seat member 61, the present fuel shut-off valve 10 according to Example No. 1 comprises the float 52 whose second sealing portion 56a presses the lip-shaped portion 61e upward. Note herein that the present fuel shut-off valve 10 according to Example No. 1 comprises the ring-shaped set member 61 whose thin-film-shaped portion 61g, which is disposed between the base 61a and the lip-shaped portion 61e. Moreover, the thin-film-shaped portion 61g can deform elastically by the pressing force that the second sealing portion 56a exerts to the lip-shaped portion 61e when the second sealing portion 56a seats on the lip-shaped portion 61e. Accordingly, the pressing force can readily deform the thin-film-shaped portion 61g, which is disposed between the base 61a and the lip-shaped portion 61e, elastically. Consequently, the lip-shaped portion 61e can seal between itself and the second sealing portion 56a securely as shown in FIG. 6. In addition, even if the float 52 should have ascended in inclined manner, the thin-film-shaped portion 61g, which undergoes elastic deformation freely, enables the lip-shaped portion 61e to seal between itself and the inclined second sealing portion 56a securely.

Moreover, the thin-film-shaped portion 61g deforms elastically to absorb the pressing force that the float 52's second sealing portion 56a exerts. As a result, the ring-shaped seat member 61 is inhibited from deforming elastically as a whole. Therefore, the base 61a and holding portion 61d are inhibited from deforming elastically. All in all, the base 61a and holding portion 61d are inhibited from coming off from the fixing portion 62d of the valve body 62. In addition, since the thin-film-shaped portion 61g enables the seating portion 61j of the ring-shaped seat member 61 to exhibit proper flatness securely, it upgrades the sealability between the seating portion 61j and the first sealing portion 31c of the casing body 30 as well.

Moreover, the bottom surface of the ring-shaped seat member 61's base 61a makes the stopper surface 61f that defines the topmost position to which the buoyant force raises the float 52 fully within the valve chamber 30S. Accordingly, it is possible to inhibit the float 52 from ascending excessively. Consequently, it is possible to prohibit the ring-shaped seat member 61's lip-shaped portion 61e and thin-film-shaped portion 61g from deforming excessively. Thus, the ring-shaped seat member 6 exhibits enhanced durability.

In addition, the ring-shaped seat member 61 is provided with the ring-shaped groove 61h, which is disposed between the bottom surface of the base 61a and the lip-shaped portion 61e, or which divides the seat member 61's bottom surface into the base 61a's bottom surface and the lip-shaped portion 61e's bottom surface. The thin-film-shaped portion 61g is disposed between the ring-shaped groove 61h and the lip-shaped portion 61g, or intervenes between the base 61a and the lip-shaped portion 61e. Note that the ring-shaped seat member 61 is manufactured by means of injection molding using mold. Moreover, upon molding the ring-shaped seat member 61, the ring-shaped groove 61h is formed parallelly to the direction of removing the completed ring-shaped seat member 61 from the mold. Hence, the ring-shaped seat member 61 exhibits good removability from mold.

Figure 8:
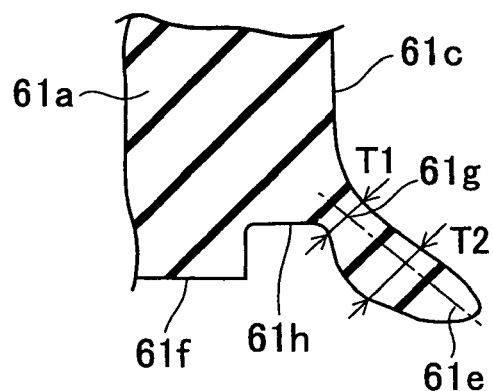
Figure 8:
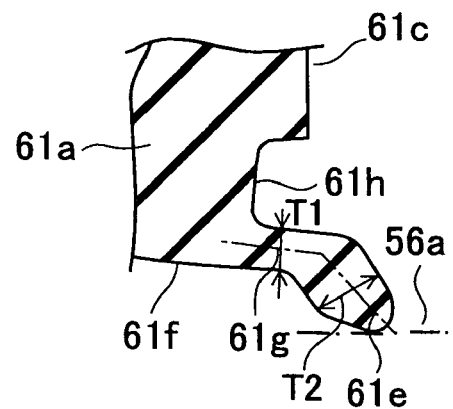
Figure 8:
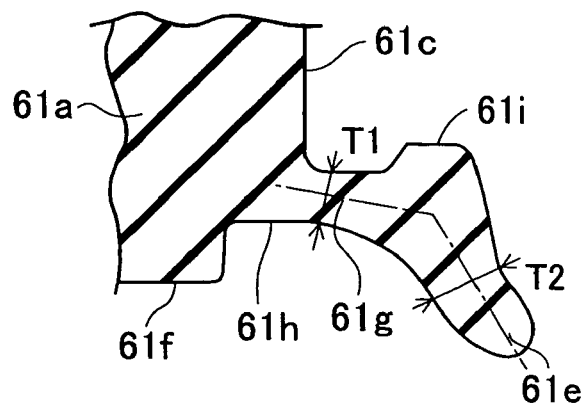
Figure 8:
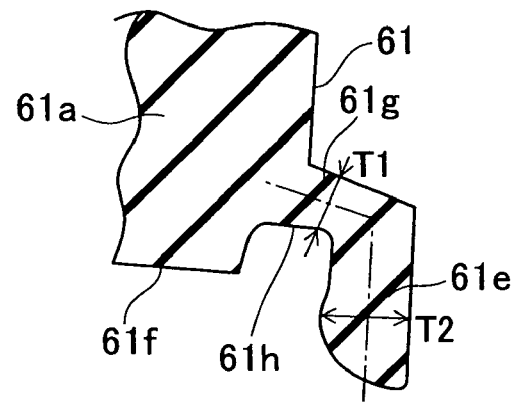

The present fuel shut-off valve 10 according to Example No. 1 comprises the ring-shaped seat member 61 whose lip-shaped portion 61e extends from the thin-film-shaped portion 61g in the axial direction of the ring-shaped seat member 61 as shown in FIG. 5. Accordingly, the lip-shaped portion 61e contacts with the float 52's second sealing portion 56a perpendicularly. However, as illustrated in FIG. 8(a), the lip-shaped portion 61e can extend from the thin-film-shaped portion 61g while inclining in a diametrically-inward direction. In this first modified version of the ring-shaped seat member 61, the lip-shaped portion 61e can contact with the float 52's second sealing portion 56a in inclined manner.

Moreover, the present shut-off valve 10 according to Example No. 1 comprises the ring-shaped seat member 61 whose ring-shaped groove 61h is disposed between the base 61a's stopper surface 61f and the lip-shaped portion 61e as shown in FIG. 5. However, as illustrated in FIG. 8(b), the thin-film-shaped portion 61g can be disposed between the base 61a's inner peripheral surface 61c, which is disposed so as to look the connector bore 61b downward from inside, or which is disposed substantially perpendicularly to it, and the lip-shaped portion 61e. In this second modified version of the seat member 61 shown in FIG. 8(b), the ring-shaped groove 61h is formed so that it dents into the base 61a's inner peripheral surface 61c in a diametrically-outward direction with respect to the connector bore 61b, and thereby the thin-film-shaped portion 61g is disposed immediately beneath the ring-shaped groove 61h. Accordingly, the second modified version of the ring-shaped seat member 61 comprises the thin-film-shaped portion 61g, which is more likely to deform elastically. Consequently, the second modified version of the ring-shaped seat member 61 exhibits furthermore improved sealability to the float 52's second sealing portion 56a.

In addition, the present shut-off valve 10 according to Example No. 1 comprises the ring-shaped seat member 61 whose lip-shaped portion 61e has a thicker thickness than that of the thin-film-shaped portion 61g as shown in FIG. 8(d). However, as illustrated in FIG. 8(c), a protruded portion 61i can be disposed so as to intervene between the thin-film-shaped portion 61g and the lip-shaped portion 61e.

It is preferable that the present shut-off valve 10 according to Example No. 1 can comprise the ring-shaped seat member 61 whose thin-film-shaped portion 61g has a thickness T1, which is smaller than a thickness T2 that the lip-shaped portion 61e exhibits when the second sealing portion 56a of the float 52 does not seat on the lip-shaped portion 61e as shown in FIG. 8(d). If such is the case, the thin-film-shaped portion 61g is much more likely to flex. The thickness of the thin-film-shaped portion 61g, and the thickness of the lip-shaped portion 61e herein refer to the diameter of the thin-film-shaped portion 61g that is perpendicular to the longitudinal direction of the thin-film-shaped portion 61g, and to the diameter of the lip-shaped portion 61e that is perpendicular to the longitudinal direction of the lip-shaped portion 61e, respectively. In the first, second and third modified versions of the ring-shaped seat member 61 shown in FIGS. 8(a), 8(b) and 8(c), it is likewise preferable that the thin-film-shaped portion 61g can have a thickness T1, which is smaller than a thickness T2 that the lip-shaped portion 61e exhibits when the second sealing portion 56a of the float 52 does not seat on the lip-shaped portion 61e.

Moreover, the present shut-off valve 10 according to Example No. 1 makes a two-stage valve structure that carries out first valve opening and closing between the ring-shaped seat member 61's top seating portion 61j and the casing body 30's first sealing portion 31c; and that carries out second valve opening and closing between the ring-shaped seat member 61's bottom lip-shaped portion 61e and the float 52's second sealing portion 56a. However, the present invention can be applied to a three-stage valve structure in which the float 52 further comprises an intermediate valve element and a lower valve element. In this case, the lip-shaped portion 61e of the ring-shaped seat member 61, with which the upper valve element 60 is provided, seals between itself and the intermediate valve element's second sealing portion.

Example No. 2

Figure 9:
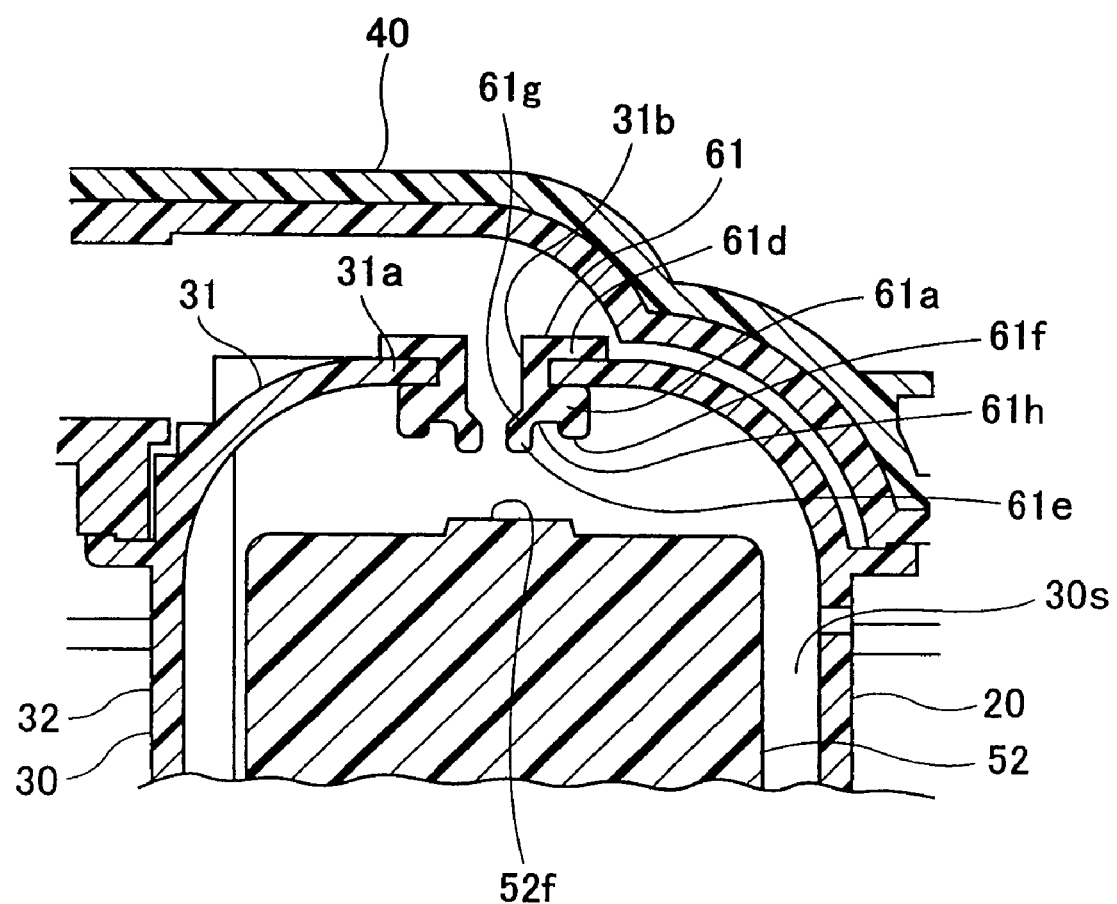
FIG. 9 is a cross-sectional view for illustrating a fuel shut-off valve according to Example No. 2 of the present invention.

A fuel shut-off valve according to Example No. 2 of the present invention will be hereinafter described with reference to FIG. 9. As illustrated in the drawing, the present fuel shut-off valve according to Example No. 2 differs from Example No. 1 in that the ring-shaped seat member 61 is fixed to the casing 20. Similarly to Example No. 1, the casing 20 comprises the casing body 30, which is surrounded by the top-walled portion 31 and side-walled portion 32. The central part of the casing body 30's top-walled portion 31 is provided with the passage-forming protrusion 31a. The passage-forming protrusion 31a protrudes radially inward, thereby facing to each other so as to make the connector passage 31b provisionally. The ring-shaped seat member 61, which is made from elastomer, is fixed to the passage-forming protrusion 31a. Moreover, the valve chamber 30S, which is surrounded by the casing 20, accommodates the float 52 therein. The float 52 ascends and descends by increasing and decreasing buoyant force exerted thereto depending on fuel-liquid level within the valve chamber 30S, thereby closing and opening the connector passage 31b. The float 52 is disposed under the ring-shaped seat member 61 so as to make space between the upper sealing portion 52f, being disposed on the top of the float 52, and the lip-shaped member 61e, being disposed on the bottom of the ring-shaped seat member 61. The float 52 goes down to produce and goes up not to produce the space between the sealing portion 52f and the lip-shaped portion 61e, thereby carrying out the opening and closing of the connector passage 31b.

The ring-shaped seat member 61 comprises the base 61a, the holding portion 61d, and the lip-shaped portion 61e. The holding portion 61d holds the passage-forming protrusion 31a between itself and the based 61a. The lip-shaped portion 61e is disposed down below the bottom surface of the base 61a to demarcate the bottom opening of the connector passage 31b, and is opened and closed by the sealing portion 52f of the float 52. The ring-shaped seat member 61 further comprises the thin-film-shaped portion 61g, which is disposed between the base 61a and the lip-shaped portion 61e. The thin-film-shaped portion 61g can undergo elastic deformation when the sealing portion 52f seats on the lip-shaped portion 61e. Moreover, the bottom surface of the base 61a makes the stopper surface 61f that defines the topmost position to which the float 52 is raised fully by buoyant force within the valve chamber 30S. In addition, the ring-shaped seat member 61 furthermore comprises the ring-shaped groove 61h, which is disposed between the stopper surface. 61f and the lip-shaped portion 61e. Note that the thin-film-shaped portion 61g of the ring-shaped seat member 61 can incline from small to large outwardly to separate away from the float 52 with respect to a diametric direction of the ring-shaped seat member 61.

The present fuel shut-off valve according to Example No. 2 operates as hereinafter described. When fuel is supplied into the fuel tank FT and then the liquid-fuel level ascends within the fuel tank FT to arrive at a predetermined liquid level, the liquid fuel flowing into the valve chamber 30S exerts buoyant force to the float 52, and thereby the float 52 ascends. The ascending float 52 closes the connector passage 31b, because the sealing portion 52f of the ascending float 52 seats on the lip-shaped portion 61e of the stationary ring-shaped seat member 61, which is fixed to casing 20, so that the stationary lip-shaped portion 61e seals between itself and the sealing portion 52f. Thus, the present fuel shut-off valve according to Example No. 2 shuts off the fuel tank FT with respect to the outside, and accordingly inhibits the liquid fuel from flowing out to the outside. Moreover, when the liquid-fuel level lowers within the fuel tank FT, the float 52 descends to produce space between the descending sealing portion 52f and the stationary ring-shaped seat member 61's lip-shaped portion 61e, and to cancel the sealing therebetween. Consequently, the float 52 opens up the connector passage 31b.

Note herein that, when the float 52, which ascends upon refueling liquid oil, seats on the ring-shaped seat member 61's lip-shaped portion 61e, the lip-shaped portion 61e is pressed upward by the float 52's sealing portion 52f. Moreover, the ring-shaped seat member 61, which makes the present fuel shut-off valve according to Example No. 2, comprises the thin-film-shaped portion 61g, which is disposed between the base 61a and lip-shaped portion 61e of the ring-shaped seat member 61. In addition, when the sealing portion 52f seats on the lip-shaped portion 61e, the sealing portion 52f exerts pressing force to the lip-shaped portion 61e, and then the thin-film-shaped portion 61g can be readily deformed elastically by the resulting pressing force. Accordingly, the lip-shaped portion 61e exhibits such enhanced followability with respect to the sealing portion 52f that the lip-shaped portion 61e can seal between itself and the sealing portion 52f securely. Moreover, even if the float 52 should have ascended in inclined manner, the thin-film-shaped portion 61g can deform elastically so freely that the lip-shaped portion 61e can seal between itself and the inclined sealing portion 56f securely.

Moreover, the pressing force that the float 52's sealing portion 52f exerts to the ring-shaped seat member 61's lip-shaped portion 61e is absorbed by the ring-shaped seat member 61's thin-film-shaped portion 61g because of the elastic deformation of the thin-film-shaped portion 61g. As a result, the thin-film-shaped portion 61g inhibits the ring-shaped seat member 61 from deforming elastically as a whole. Therefore, the thin-film-shaped portion 61g inhibits the base 61a and holding portion 61d from deforming elastically. All in all, the thin-film-shaped portion 61g prevents the base 61a and holding portion 61d from coming off from the casing 20's passage-forming protrusion 31a. From above, it is possible to think of the following modifications to the fuel shut-off valve according to Example No. 2. For example, the fuel'shut-off valve according to Example No. 2 can further comprise an inner peripheral surface 61c, which faces the connector bore 61b of the base 61a to partially make the base 61b of the ring-shaped seat member 61, and which is provided with a ring-shaped groove 61h being disposed adjacently to the lip-shaped portion 61e. Moreover, the thin-film-shaped portion 61g of the ring-shaped seat member 61 can extend in a diametrically inward direction of the ring-shaped seat member 61. In addition, the thin-film-shaped portion 61g of the ring-shaped seat member 61 can incline from large to small inwardly to separate away from the float 52 with respect to a diametric direction of the ring-shaped seat member 61. Moreover, the ring-shaped seat member 61 can further comprise a connecting portion (described below), which is disposed between the base 61a and the lip-shaped portion 61e; and the ring-shaped groove 61h can be disposed between the connecting portion and the base 61b, thereby neighboring the thin-film-shaped portion 61g on the ring-shaped groove 61h. In addition, the ring-shaped seat member 61 can comprise the ring-shaped groove 61h, which is disposed immediately beneath an inner peripheral surface of the ring-shaped seat member 61's base 61a.

Example No. 3

Figure 10:
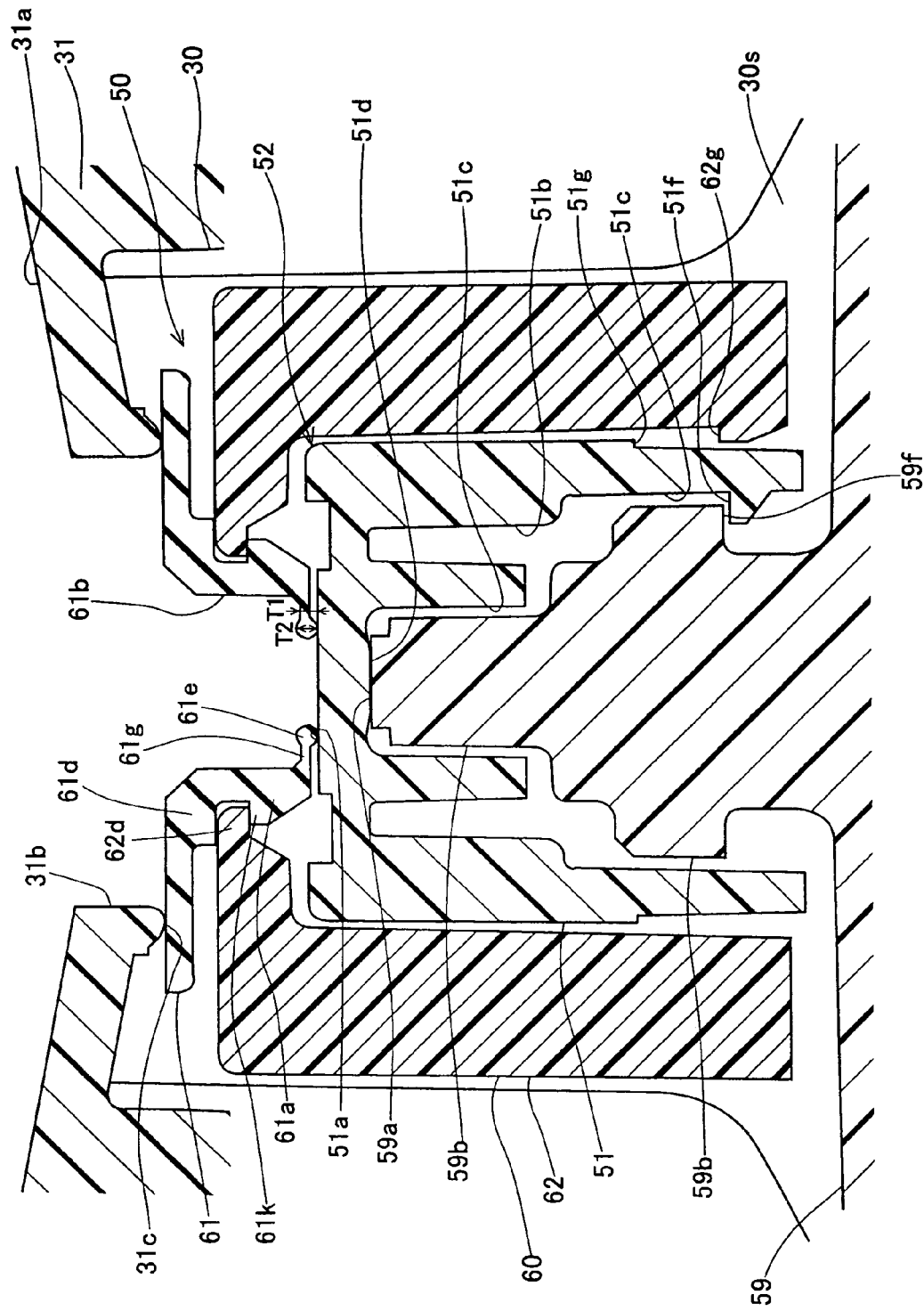
FIG. 10 is a cross-sectional view for illustrating a fuel shut-off valve according to Example No. 3 of the present invention.

A fuel shut-off valve according to Example No. 3 of the present invention comprises a modified version of the ring-shaped seat member 61. Specifically, as illustrated in FIG. 10, this ring-shaped seat member 61 comprises the base 61a, and the thin-film-shaped portion 61g. Contrary to the ring-shaped seat member 61 of Example Nos. 1 and 2, this ring-shaped seat member 61 comprises the thin-film-shaped portion 61g, which extends horizontally from the base 61a in a diametrically inward direction of the ring-shaped seat member 61. Moreover, this ring-shaped seat member 61 is free from the ring-shaped groove 61h that is disposed between the base 61a and the lip-shaped portion 61e in the ring-shaped seat member 61 of Example Nos. 1 and 2. In addition, this ring-shaped seat member 61 comprises the lip-shaped portion 61e, which is disposed at the diametrically-inward leading end of the thin-film-shaped portion 61g. Note that the lip-shaped portion 61e has a thickness T2, which is larger than a thickness T1 that the thin-film-shaped portion 61g has so that a ratio of T2 to T1, T2/T1, can preferably fall in a range of from 1.1 to 10, more preferably in a range of from 1.1 to 3.0.

The present fuel shut-off valve according to Example No. 3 further comprises a modified version of the float mechanism 50, which makes a three-stage structure. For example, this float mechanism 50 comprises an upper valve element 60, and a float 52, which is provided with an intermediate valve element 51 and a lower valve element 59. Similarly to the upper valve element 60 of Example No. 1, this upper valve element 60 comprises the ring-shaped seat member 61, and a valve body 62 for retaining the ring-shaped seat member 61. As indicated above, the float 52 comprises the intermediate valve element 51, and the lower valve element 59. The intermediate valve 51 is disposed under the upper valve element 60. The lower valve element 59 is disposed under the intermediate valve element 51. The intermediate valve element 51 is formed as a hollow cylindrical body substantially, and is provided with a second sealing portion 51a on the top surface. The intermediate valve element 51 is disposed ascendably to the upper valve element 60 and descendably therefrom, and thereby the second sealing portion 51a is disposed so as not to provide and so as to provide space between itself and the ring-shaped seat member 61's lip-shaped portion 61e. The inside of the intermediate valve element 51 is provided with an accommodation space 51b, which accommodates the lower valve element 59's head 59a ascendably and descendably therein. Moreover, the intermediate valve element 51 is provided with an inner walled protrusion, which protrudes downward from the top walled portion's inner surface. The inner walled protrusion is formed so as to make a guide surface 51c, which guides an outer peripheral surface 59b of the lower valve element 59's head 59a. In addition, under the lower valve element 59, a clearance, which accommodates a spring therein, is formed in the same manner as Example No. 1. Thus, a spring is disposed to bridge over between the lower valve element 59 and the bottom-walled member of the casing 20.

The operations of the present fuel shut-off valve according to Example No. 3 will be hereinafter described. When supplied liquid fuel results in flowing into the valve chamber 30s, the liquid fuel exerts buoyant force to the lower valve element 59 so that the lower valve element 59 ascends while bringing its head 59a into contact with the intermediate valve element 59's inner top-walled surface 51d. On this occasion, the lower valve element 59 turns into being integral with the intermediate valve element 51 and upper valve element 60, and thereby the entire float mechanism 50 ascends within the valve chamber 30s. Moreover, the float mechanism 50 ascends in such a manner that the ring-shaped seat member 61's lip-shaped portion 61e closes between itself and the intermediate valve element 51's second sealing portion 51a. Eventually, the upper valve element 60's ring-shaped seat member 61 seats on the passage-forming protrusion 31a's first sealing portion 31c to close the connector passage 31b. Thus, it is possible for the present fuel shut-off valve according to Example No. 3 to inhibit the refilled liquid fuel from flowing but to the not-shown outside canister via the connector passage 31b.

On the other hand, when the liquid fuel inside the fuel tank is consumed to lower the liquid-fuel level within the valve chamber 30s, the lower valve element 59 descends because the buoyant force being exerted thereto decreases. At this moment, the lower valve element 59 pulls down the intermediate valve element 51, because an annular protrusion 59f, which is disposed on the lower valve element 59's outer peripheral walled surface 59b, engages with an engager claw 51f, which is disposed on the intermediate valve element 51's inner walled surface. Then, the intermediate valve element 51's second sealing portion 51a separates away from the ring-shaped seat member 61's lip-shaped portion 61e, and thereby the ring-shaped seat member 61's connector bore 61b is first communicated with the valve chamber 30s. Moreover, when the liquid-fuel level further lowers within the valve chamber 30s, the lower valve element 59 descends together with the intermediate valve element 51. Then, the upper valve element 60 descends, because an annular protrusion 51g, which protrudes from the intermediate valve element's outer peripheral walled surface, engages with an engage claw 62g, which protrudes from the upper valve element 60's inner peripheral walled surface (or its valve body 62's inner peripheral walled surface, specifically) Thus, the upper valve element 60's ring-shaped seat member 61 separates away from the passage-forming protrusion 31a's first sealing portion 31c, and thereby the connector passage 31b communicates with the valve chamber 30s.

The present fuel shut-off valve according to Example No. 3 comprises the ring-shaped seat member 61 whose thin-film-shaped portion 61g extends in a diametrically inward direction of the ring-shaped seat member 61. Accordingly, the thin-film-shaped portion 61g is more likely to be deformed by axial force that is exerted to the ring-shaped seat member 61 in an axial direction of the ring-shaped seat member 61, that is, in a direction perpendicular to the diametric direction of the ring-shaped seat member 61. Moreover, the ring-shaped seat member 61's lip-shaped portion 61e exhibits higher rigidity than the thin-film-shaped portion 61g does, because the lip-shaped portion 61e has a thicker thickness than that of the thin-film-shaped portion 61g. Consequently, even if the float 52 should have floated up in inclined manner and should have seated on the lip-shaped portion 61e in inclined manner, it is possible for the thin-film-shaped portion 61g to deform while following up the second sealing portion 51a of the inclined float 52's intermediate valve element 51 well. Therefore, it is possible for the ring-shaped seat member 61 to produce the sealability between its lip-shaped portion 61e and the intermediate valve element 51's second sealing portion 51a more securely.

Example No. 4

Figure 11:
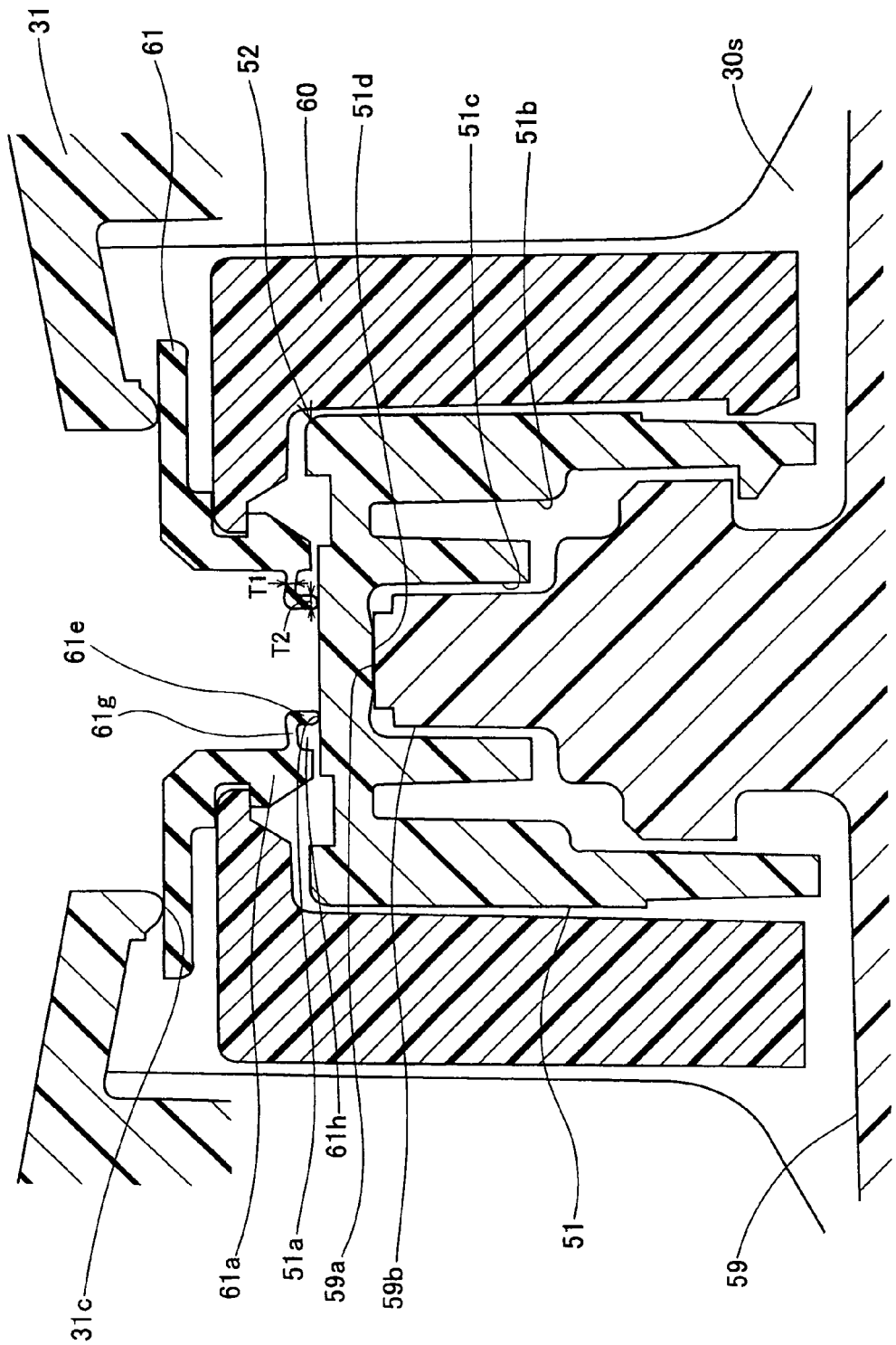
FIG. 11 is a cross-sectional view for illustrating a fuel shut-off valve according to Example No. 4 of the present invention.

A fuel shut-off valve according to Example No. 4 of the present invention differs from the present fuel shut-off valve according to Example No. 3 in that it comprises a ring-shaped seat member 61, which is configured differently from that of the present fuel shut-off valve according to Example No. 3. Specifically, as illustrated in FIG. 11, this ring-shaped seat member 61 comprises a thin-film-shaped portion 61g, which extends in a diametrically inward direction of the ring-shaped seat member 61 substantially, and which inclines from large to small inwardly with respect to a diametric direction of the ring-shaped seat member 61 in such a manner that it separates away from the float 52. Moreover, this ring-shaped seat member 61 comprises a ring-shaped groove 61h, which dents from the bottom surface of a base 61a in an axially upward direction of the ring-shaped seat member 61 in the drawing. In addition, the thin-film-shaped portion 61g makes the bottom of the ring-shaped groove 61h. Moreover, the thin-film-shaped portion 61g's diametrically inward leading end is provided with a lip-shaped portion 61e, which protrudes axially downward in the drawing. In addition, the thin-film-shaped portion 61g has a thickness T1, which is smaller than a thickness T2 that the lip-shaped portion 61e has so that a ratio of T2 to T1, T2/T1, can preferably fall in a range of from 1.1 to 10, more preferably in a range of from 1.1 to 3.0. The thus modified ring-shaped seat member 61 comprises the thin-film-shaped portion 61g, which is more likely to deform elastically. Hence, the thin-film-shaped portion 61g enables this ring-shaped seat member 61 to seal between its lip-shaped portion 61e and the intermediate valve element 51's second sealing portion 51a much more securely.

Example No. 5

Figure 12:
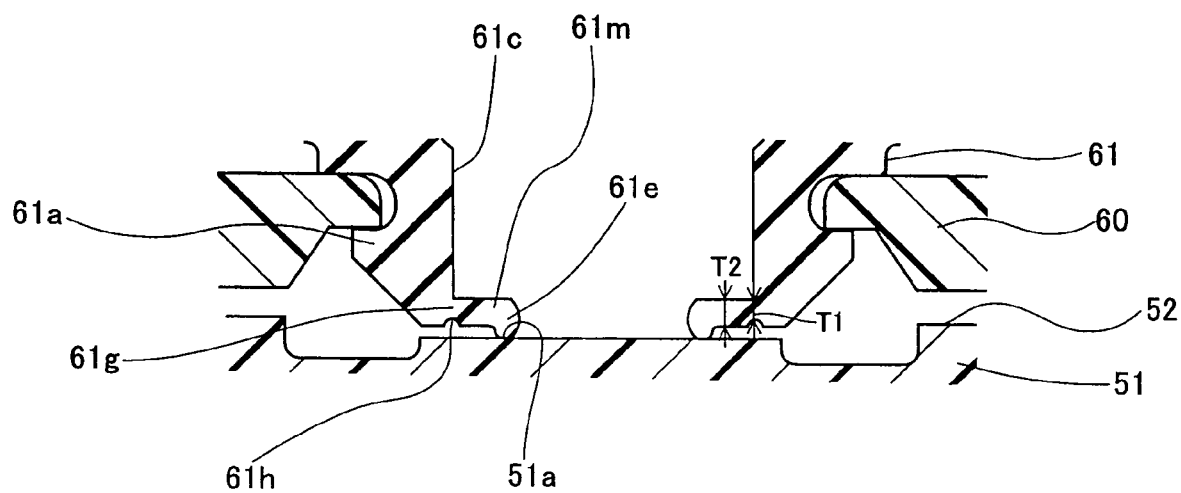
FIG. 12 is a cross-sectional view for illustrating a major part of a fuel shut-off valve according to Example No. 5 of the present invention at around an upper valve element and a float that make the fuel shut-off valve.

A fuel shut-off valve according to Example No. 5 of the present invention differs from the present fuel shut-off valve according to Example No. 3 in that it comprises a ring-shaped seat member 61, which is configured differently from that of the present fuel shut-off valve according to Example No. 3. Specifically, as illustrated in FIG. 12, this ring-shaped seat member 61 comprises a connecting portion 61m, which is disposed between a base 61a and a lip-shaped portion 61e. Moreover, this ring-shaped seat member 61 comprises a groove 61h, which is disposed between the connecting portion 61m and the base 61a, thereby neighboring a thin-film-shaped portion 61g on the ring-shaped groove 61h from above. In addition, the connecting portion 61m has a thickness T2, which is thicker than a thickness T1 of the thin-film-shaped portion 61g so that a ratio of T2 to T1, T2/T1, can preferably fall in a range of from 1.1 to 10, more preferably in a range of from 1.1 to 3.0. Therefore, when the second sealing portion 51a of float 52's intermediate valve element 51 seats on the thus modified ring-shaped seat member 61's lip-shaped portion 61e, this ring-shaped seat member 61's thin-film-shaped portion 61g flexes, and thereby this seat member 61 can exhibit furthermore improved sealability between its lip-shaped portion 61e and the intermediate valve element 51's second sealing portion 51a.

Moreover, this ring-shaped seat member 61 comprises the ring-shaped groove 61h, which is placed immediately beneath the base 61a's inner peripheral walled surface 61c. Accordingly, the thin-film-shaped portion 61g is positioned immediately beneath the base 61a's inner peripheral walled surface 61c. Consequently, the thin-film-shaped portion 61g is more likely to flex. Therefore, the thin-film-shaped portion 61g, which is more likely to deform elastically, furthermore upgrades the followability of the lip-shaped portion 61e to the second sealing portion 51a of the float. 52's intermediate valve element 51.

Note that, in the present fuel shut-off valve according to Example No. 5, the modified ring-shaped seat member 61 further comprises the connecting portion 61m, which extends parallel to a diametric direction of the ring-shaped seat member 61. However, the connecting portion 61m can incline upward or downward with respect to a diametric direction of the ring-shaped seat member 61. Even when the modified ring-shaped seat member 61 comprises the thus inclined connecting portion 61m, it is possible to position the thin-film-shaped portion 61g immediately beneath the base 61a's inner peripheral walled surface 61c by disposing the groove 61h between the modified ring-shaped seat member 61's base 61a and inclined connecting portion 61m and by placing the ring-shaped groove 61h immediately beneath the base 61a's inner peripheral walled surface 61c.

A few of the present invention have been heretofore described fully. However, note that it will be apparent to one of ordinary skill in the art that the present invention is not limited to the above-described specific examples, and that many changes and modifications can be made thereto without departing from the spirit or scope of the present invention as set forth herein including the appended claims.

What is claimed is:

1. A fuel shut-off valve being disposed on the top of fuel tank, and opening and closing connector passage connecting the inside of the fuel tank to the outside, thereby communicating the inside of the fuel tank with the outside and shutting off the connector passage, the fuel shut-off valve comprising:

a casing comprising a valve chamber communicating the inside of the fuel tank with the connector passage, and a first sealing portion surrounding the connector passage;

a float being accommodated in the valve chamber of the casing, having a second sealing portion, and being exerted to increasing and decreasing buoyant force depending on liquid level within the valve chamber, thereby ascending and descending within the valve chamber; and an upper valve element being disposed on the top of the float, and being actuated by the float, which ascends and descends, to open and close the connector passage;

the upper valve element comprising a valve body, and a ring-shaped seat member, the ring-shaped seat member being made from elastomer, being fixed to the valve body and making a connector bore therein, the connector bore having a top opening and a bottom opening;

the ring-shaped seat member comprising a base, a holding portion which holds the valve body of the upper valve element between itself and the base, a seating portion which opens and closes the connector passage, and which defines the top opening of the connector bore of the ring-shaped seat member, a lip-shaped portion which seats on and separates away from the second sealing portion of the float, which protrudes down below beyond the bottom surface of the base and which defines the bottom opening of the connector bore of the ring-shaped seat member, and a thin-film-shaped portion which is disposed between the base and the lip-shaped portion, and which is deformable elastically upon being pressed by the second sealing portion of the float when the second sealing portion seats on the lip-shaped portion, wherein the bottom surface of the ring-shaped seat member's base makes a stopper surface, which defines the topmost position to which the float ascends by means of the buoyant force fully within the valve chamber of the casing, wherein the ring-shaped seat member further comprises a ring-shaped groove, which is disposed between the bottom surface of the base and the lip-shaped portion, wherein the thickness of the thin-film-shaped portion is smaller than that of the lip-shaped portion, and wherein the thin-film-shaped portion is disposed above the stopper surface.

2. The fuel shut-off valve according to claim 1 further comprising an inner peripheral surface, which faces the connector bore of the base to partially make the base of the ring-shaped seat member, and which is provided with a ring-shaped groove being disposed adjacently to the lip-shaped portion.

3. The fuel shut-off valve according to claim 1, wherein the thin-film-shaped portion of the ring-shaped seat member extends in a diametrically inward direction of the ring-shaped seat member.

4. The fuel shut-off valve according to claim 1, wherein the thin-film-shaped portion of the ring-shaped seat member inclines from small to large outwardly to separate away from the float with respect to a diametric direction of the ring-shaped seat member.

5. The fuel shut-off valve according to claim 1, wherein the thin-film-shaped portion of the ring-shaped seat member inclines from large to small inwardly to separate away from the float with respect to a diametric direction of the ring-shaped seat member.

6. The fuel shut-off valve according to claim 1, wherein:
the ring-shaped seat member further comprises a connecting portion, which is disposed between the base and the lip-shaped portion; and
the ring-shaped groove is disposed between the connecting portion and the base, thereby neighboring the thin-film-shaped portion on the ring-shaped groove.

7. The fuel shut-off valve according to claim 1, wherein the ring-shaped seat member comprises the ring-shaped groove, which is disposed immediately beneath an inner peripheral surface of the ring-shaped seat member's base.

* * * * *